United States Patent
Lienhard et al.

(10) Patent No.: US 12,204,994 B2
(45) Date of Patent: Jan. 21, 2025

(54) MACHINE LEARNING ASSISTED QUBIT STATE READOUT

(71) Applicants: RTX BBN Technologies, Inc., Cambridge, MA (US); MASSACHUSETTS INSTITUTE OF TECHNOLOGY, Cambridge, MA (US)

(72) Inventors: Benjamin Lienhard, Somerville, MA (US); William D. Oliver, Arlington, MA (US); Simon Gustavsson, Cambridge, MA (US); Antti Pekka Vepsalainen, Malden, MA (US); Terry Philip Orlando, Norton, MA (US); Luke Colin Gene Govia, Somerville, MA (US); Hari Kiran Krovi, Lexington, MA (US); Thomas Ohki, Arlington, MA (US)

(73) Assignees: RTX BBN TECHNOLOGIES, INC., Cambridge, MA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 872 days.

(21) Appl. No.: 17/025,374

(22) Filed: Sep. 18, 2020

(65) Prior Publication Data
US 2021/0150402 A1 May 20, 2021

Related U.S. Application Data

(60) Provisional application No. 62/936,958, filed on Nov. 18, 2019.

(51) Int. Cl.
G06N 10/00 (2022.01)
G06F 18/214 (2023.01)
(Continued)

(52) U.S. Cl.
CPC .......... *G06N 10/40* (2022.01); *G06F 18/2155* (2023.01); *G06N 3/08* (2013.01); *G06N 10/60* (2022.01); *G06N 10/70* (2022.01)

(58) Field of Classification Search
CPC .......... G06F 18/2155; G06F 18/24317; G06N 10/00; G06N 3/08
See application file for complete search history.

(56) References Cited

U.S. PATENT DOCUMENTS

| 2014/0199281 | A1 | 7/2014 | Henn et al. | |
| 2020/0169396 | A1* | 5/2020 | Neven | H04L 9/0852 |
| 2020/0286595 | A1* | 9/2020 | Neukart | G06F 30/3308 |

FOREIGN PATENT DOCUMENTS

CN 113046553 A 6/2021

OTHER PUBLICATIONS

Rigetti et al., "Geometric Approach to Digital Quantum Information", Dec. 2004, Quantum Information Processing, vol. 3, No. 6, pp. 351-380. (Year: 2004).*

(Continued)

*Primary Examiner* — Brent Johnston Hoover
(74) *Attorney, Agent, or Firm* — CANTOR COLBURN LLP

(57) ABSTRACT

Techniques for machine learning assisted qubit state readout are disclosed. A system a set of training data that describes states of multiple qubits, and trains a neural network to determine qubit states based on the set of training data. The system obtains one or more unlabeled qubit signals, and determines one or more states corresponding to the unlabeled qubit signal(s), using the neural network. The unlabeled qubit signal(s) may include one or more multiplexed qubit signals, and the state(s) corresponding to the unlabeled qubit signal(s) may include one or more multi-qubit states based on the multiplexed qubit signal(s).

18 Claims, 9 Drawing Sheets

(51) Int. Cl.
  *G06N 3/08*   (2023.01)
  *G06N 10/40*  (2022.01)
  *G06N 10/60*  (2022.01)
  *G06N 10/70*  (2022.01)

(56) References Cited

OTHER PUBLICATIONS

Seif et al., "Machine learning assisted readout of trapped-ion qubits", Aug. 17, 2018, J. Phys. B: At. Mol. Opt. Phys. 51 (2018) 174006 (6pp), pp. 1-6. (Year: 2018).*
Fathollahzadeh et al "Better together: Potential of co-culture microorganisms to enhance bioleaching of rare earth elements from monazite" Bioresource Technology Reports 3 pp. 109-118 (2018).
International Preliminary Report on Patentability; PCT Application No. PCT/US2023/013248 International Filing Date Feb. 16, 2023 Date of Mailing Aug. 20, 2024 (8 pages).
Jalali et al. "The Role of Microorganisms in Mobilization and Phytoextraction of Rare Earth Elements: A Review" Frontiers in Environmental Science vol. 9 Article 688430 Jun. 15, 2021 19 Pages.
Liu et al., "Reclamation with organic amendments and plants remodels the diversity and structure of bacterial community in ion-adsorption rare earth element mine tailings"; Journal of Soils and Sediments 20, pp. 3669-3680 (2020).

* cited by examiner

MACHINE LEARNING ASSISTED QUBIT STATE READOUT

RELATED APPLICATIONS

This application claims priority under 35 USC § 119(e) to U.S. Provisional Patent Application Ser. No. 62/936,958, titled "MACHINE LEARNING ASSISTED QUBIT STATE READOUT," filed Nov. 18, 2019, which is hereby incorporated by reference in its entirety for all purposes.

STATEMENT REGARDING FEDERALLY-SPONSORED RESEARCH OR DEVELOPMENT

This application was made with government support under Contract No. W911NF-17-S-0008 awarded by the Army Research Office (ARO). The U.S. Government has certain rights in this invention.

BACKGROUND

In quantum computing, the term "qubit" refers to a quantum bit. Initially, a qubit is in a state of superposition. However, measuring a qubit destroys the superposition, a process also referred to as decoherence. When a qubit's superposition is destroyed (due to measurement or some other process), the qubit has a logical state of zero (0) or one (1). The pure state of a qubit may be expressed as:

$$|\psi\rangle = a|0\rangle + b|1\rangle = \begin{pmatrix} a \\ b \end{pmatrix},$$

where a and b are corresponding probabilities for each state. The pure state of a qubit also may be visualized as a Bloch sphere. Qubits may be used in many different ways. For example, a quantum computer may be implemented using nonlinear circuits built from superconducting material.

Qubit state readout is the process of determining the state of a qubit (i.e., 0 or 1). The state of a qubit may be determined based on a state-dependent phase shift when a microwave signal is applied to the qubit. FIG. 1A illustrates an example of a system 300 for generating a state-dependent phase shift. A qubit is coupled to a microwave cavity 102 (e.g., a stripline resonator). A microwave signal is "shot" into the microwave cavity 102. The output signal from the cavity carries a phase shift that depends on the qubit's state. As illustrated in FIG. 1B, this dependency may be expressed as:

$$\alpha_{0/1}(t) = |\alpha(t)|e^{i\phi_{0/1}}$$

In addition, post-processing 104 may be used to improve the quality of the output signal. For example, post-processing 104 may include one or more amplifiers, circulators, mixers, and/or other post-processing mechanisms.

To determine the state of a qubit from the output signal, the current industry standard is homodyne detection using signal filtering. The output is expressed as $$\alpha_{0/1}(t) = \alpha_{0/1}^S(t) + \eta(t),$$

a filter kernel is expressed as $K(t)$, and an integrated signal is expressed as $$S = \int_{t_0}^{t} K^*(s)\alpha_{0/1}(s)ds$$

For example, FIG. 2 illustrates an example of a histogram of an integrated signal S. Given a density plot of S, a threshold value of S is determined to assign either qubit state 0 or qubit state 1 as the measurement outcome. For no filter, $K(t)=1$. For a matched filter, $$K(t) = \bar{\alpha}_0(t) - \bar{\alpha}_1(t),$$

i.e., the difference in the average signals when qubit state 0 or 1 is prepared. Using signal filtering, this process must be applied independently to the output signal for each qubit. If a signal includes data for multiple qubits, signal filtering must first demodulate the respective signals for each qubit.

The fidelity of a qubit state readout technique can be expressed based on a testing protocol in which the states of qubits are known (i.e., prepared) beforehand. Specifically, the fidelity is expressed as the percentage of state assignments (i.e., 0 or 1) that agree with the known state of the qubit. For a multi-qubit state, the overall fidelity is the product of fidelities for each independent readout. Thus, using signal filtering, the fidelity of an n-qubit state is the product of n fidelities determined independently for each qubit.

Approaches described in this section have not necessarily been conceived and/or pursued prior to the filing of this application. Accordingly, unless otherwise indicated, approaches described in this section should not be construed as prior art.

SUMMARY

In general, in one aspect, a system and method are provided for performing qubit state readout using a neural network. In some examples, a neural network achieves similar or better fidelity than other qubit state readout approaches (e.g., linear filter classification). In particular, a neural network may achieve similar or better fidelity with less training data than other approaches. For example, similar or better fidelity may be achieved using training data sets that are 10-100 times smaller than those needed for other approaches. In addition, high fidelity readout may be achieved using training data sets that are, for example, 10-100 smaller than the test sets.

In general, in one aspect, a system and method are provided for performing multi-qubit state readout using a neural network. Simultaneous multi-qubit state readout may use single channel data from multiplexed qubit signals. A single neural network may be trained to identify multi-qubit states, without requiring each qubit signal to be classified independently.

In general, in one aspect, one or more non-transitory machine-readable media storing instructions that, when executed by one or more processors, cause: obtaining a set of training data that describes states of multiple qubits; training a neural network to determine qubit states based on the set of training data; obtaining one or more unlabeled qubit signals; and determining one or more states corresponding to the one or more unlabeled qubit signals, using the neural network. The one or more unlabeled qubit signals may include at least one multiplexed qubit signal, and the one or more states corresponding to the one or more unlabeled qubit signals may include one or more multi-qubit states based on the at least one multiplexed qubit signal. The neural network may include a single hidden layer or multiple hidden layers.

The one or more media may further store instructions that, when executed by one or more processors, cause: multiplexing multiple qubit signals to obtain the at least one multiplexed qubit signal. The multiple qubit signals may be two qubit signals.

The one or more media may further store instructions that, when executed by one or more processors, cause: generating one or more feature vectors based on the one or more unlabeled qubit signals, wherein determining the one or more states includes applying the one or more feature vectors to the neural network.

The one or more media may further store instructions that, when executed by one or more processors, cause: discretizing the one or more unlabeled qubit signals.

In general, in one aspect, a system includes at least one device including a hardware processor. The system is configured to perform operations including: obtaining a set of training data that describes states of multiple qubits; training a neural network to determine qubit states based on the set of training data; obtaining one or more unlabeled qubit signals; and determining one or more states corresponding to the one or more unlabeled qubit signals, using the neural network. The one or more unlabeled qubit signals may include at least one multiplexed qubit signal, and the one or more states corresponding to the one or more unlabeled qubit signals may include one or more multi-qubit states based on the at least one multiplexed qubit signal. The neural network may include a single hidden layer or multiple hidden layers.

The operations may further include: multiplexing multiple qubit signals to obtain the at least one multiplexed qubit signal. The multiple qubit signals may be two qubit signals.

The operations may further include: generating one or more feature vectors based on the one or more unlabeled qubit signals, wherein determining the one or more states includes applying the one or more feature vectors to the neural network.

The operations may further include: discretizing the one or more unlabeled qubit signals.

In general, in one aspect, a method includes: obtaining a set of training data that describes states of multiple qubits; training a neural network to determine qubit states based on the set of training data; obtaining one or more unlabeled qubit signals; and determining one or more states corresponding to the one or more unlabeled qubit signals, using the neural network. The method may be performed by at least one device including a hardware processor. The one or more unlabeled qubit signals may include at least one multiplexed qubit signal, and the one or more states corresponding to the one or more unlabeled qubit signals may include one or more multi-qubit states based on the at least one multiplexed qubit signal. The neural network may include a single hidden layer or multiple hidden layers.

The method may further include: multiplexing multiple qubit signals to obtain the at least one multiplexed qubit signal. The multiple qubit signals may be two qubit signals.

The method may further include: generating one or more feature vectors based on the one or more unlabeled qubit signals, wherein determining the one or more states includes applying the one or more feature vectors to the neural network.

The method may further include: discretizing the one or more unlabeled qubit signals.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1A:
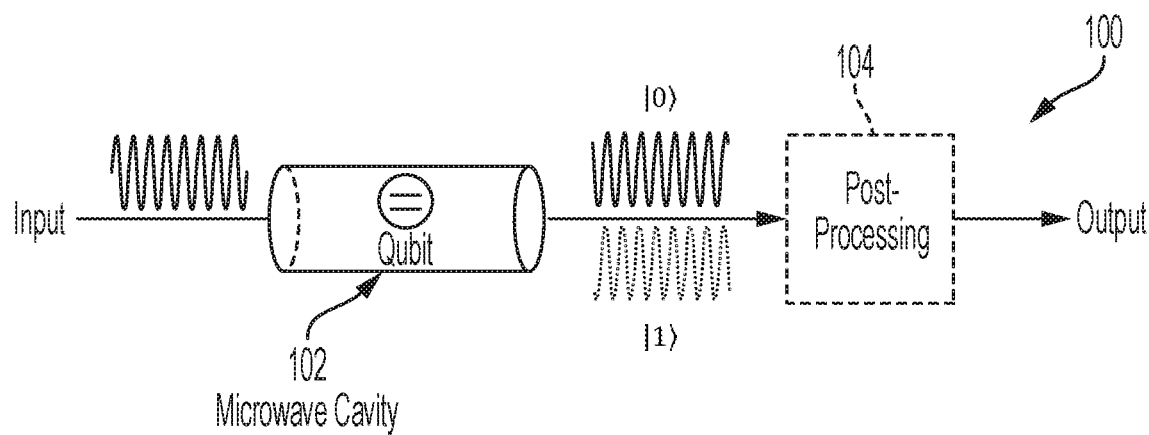
FIGS. 1A-1B are block diagrams of an example of a system for generating a state-dependent phase shift according to an embodiment.
Figure 1B:
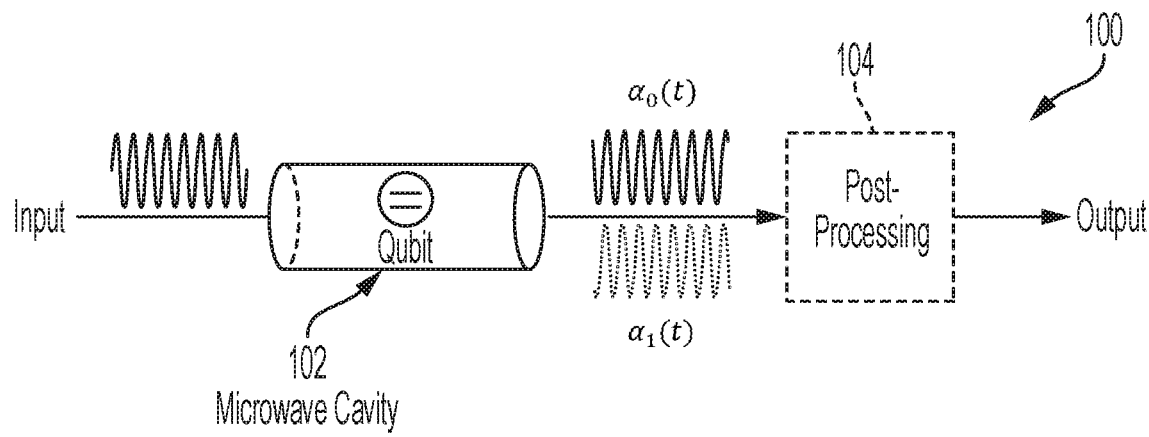
Figure 2:
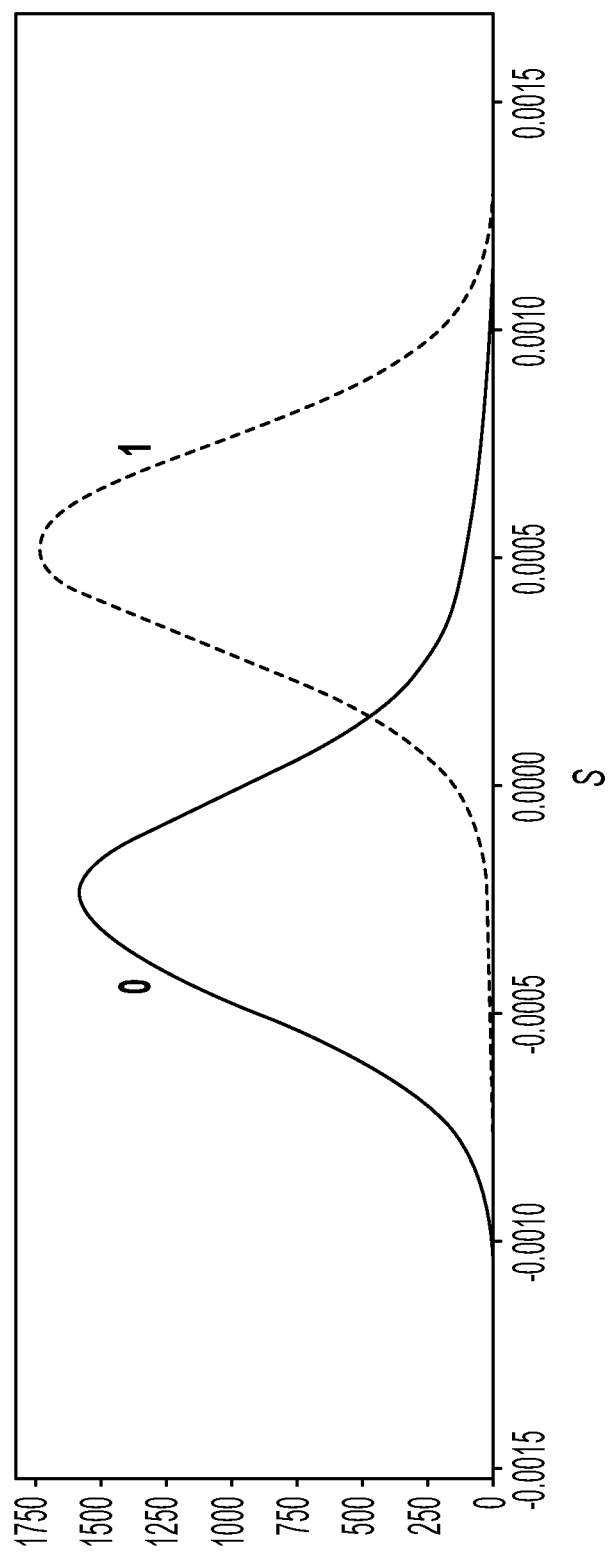
FIG. 2 illustrates an example of a histogram of an integrated signal according to an embodiment.
Figure 3:
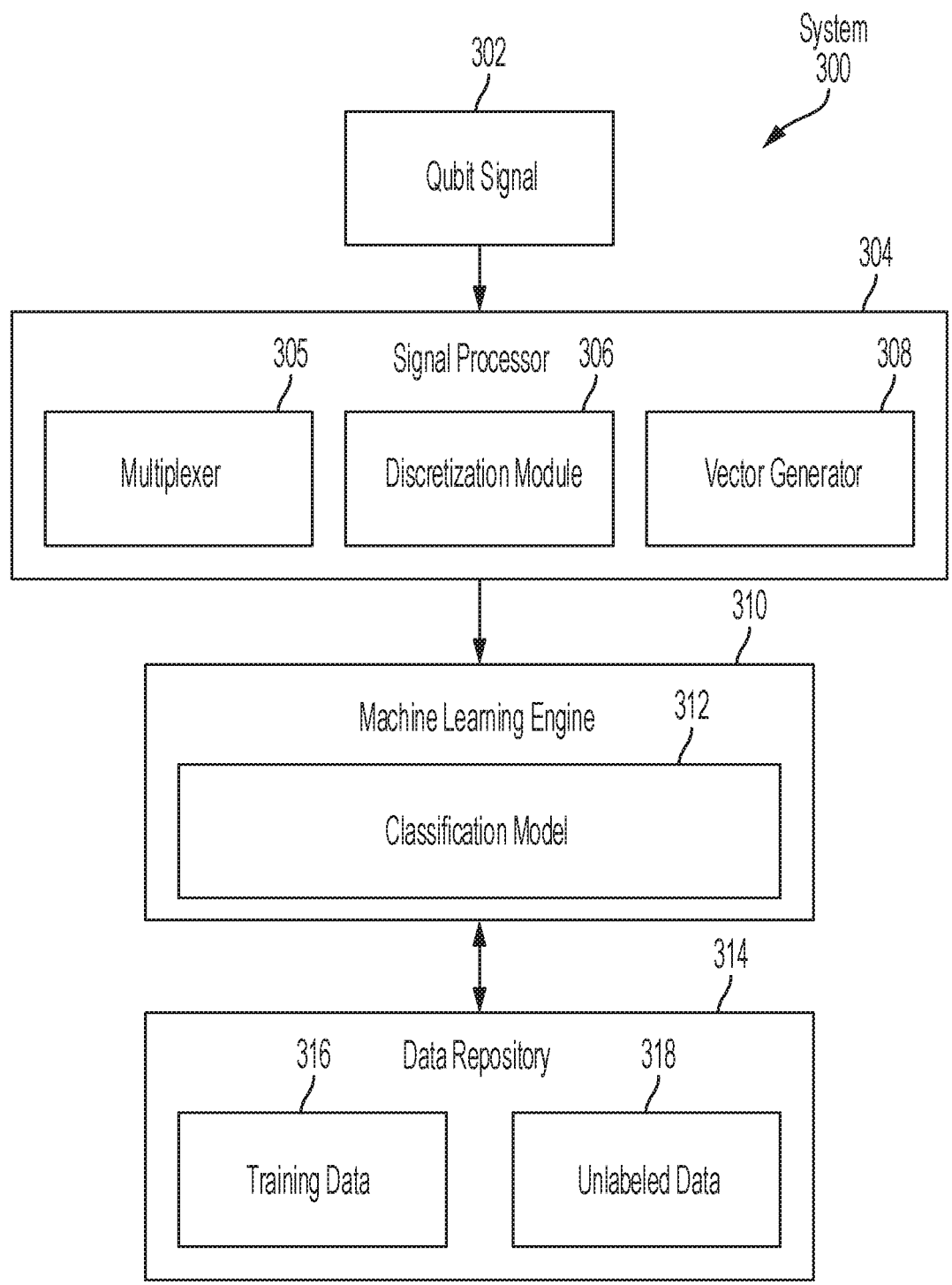
FIG. 3 is a block diagram of an example of a system according to an embodiment.

The following table of contents is provided for the reader's convenience and is not intended to define the limits of the disclosure.
1. SYSTEM ARCHITECTURE
2. OPERATIONS FOR MACHINE LEARNING ASSISTED QUBIT STATE READOUT
3. EXAMPLES
4. MISCELLANEOUS; EXTENSIONS
5. COMPUTING DEVICES
6. COMPUTER NETWORKS 1. System Architecture FIG. 3 is a block diagram of an example of a system 300 according to an embodiment. In an embodiment, the system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

As illustrated in FIG. 3, a signal processor 304 refers to hardware and/or software configured to prepare a qubit signal 302 for use by a machine learning engine 310. The qubit signal 302 may be a microwave output signal, for example, obtained as described above. Other forms of signals may be used and may be obtained in ways other than those described above. The signal processor 304 may receive two or more qubit signals 302, corresponding to a multi-qubit state, and may use a multiplexer 305 to multiplex the signals into a single signal that encodes information for the two or more qubits. For example, the multiplexer 305 may generate a multi-frequency sum of oscillations from each qubit signal 302.

In an embodiment, the signal processor 304 includes a discretization module 306. The discretization module 306 is configured to discretize the qubit signal 302, i.e., generate a set of discrete data items that approximately represent the qubit signal 302. For a multi-qubit state, the discretization module 306 may be configured to discretize a multiplexed signal generated by the multiplexer 305. For example, the discretization module 306 may generate a data structure that stores a predetermined number (e.g., 512 or another number) of elements corresponding to different values of a property (e.g., magnitude, phase, or some other property) of the qubit signal 302 over that number of time points. As received in the qubit signal 302, the values may correspond to complex numbers. The discretization module 306 may retain only the real portions of those values, and/or may simplify the values in some other way. Increasing the number of discretized data items (e.g., increasing the sampling rate or the amount of time) may improve fidelity of qubit state readout, but may take longer and/or require additional computing resources.

In an embodiment, the signal processor 304 includes a vector generator 308. The vector generator 308 is configured to generate a feature vector that is compatible with the machine learning engine 310. The feature vector includes data items corresponding to features (i.e., properties) of the qubit signal 302. For example, the feature vector may include the discretized data items generated by the discretization module 306. The feature vector may include one or more data items describing other properties of the qubit signal 302.

As illustrated in FIG. 3, a machine learning engine 310 refers to hardware and/or software configured to perform qubit state readout using machine learning. Machine learning includes various techniques in the field of artificial intelligence that deal with computer-implemented, user-independent processes for solving problems that have variable inputs.

In embodiment, the machine learning engine 310 is configured to train a classification model 312 (e.g., a neural network as described herein) to classify a qubit as having either state 0 or state 1, based on a feature vector that describes a qubit signal. In addition, the machine learning engine 310 may be configured to train the classification module 312 to classify a multi-qubit state, based on a feature vector that describes a multiplexed qubit signal 302. The machine learning engine 310 may train the classification model 312 using supervised learning. In supervised learning, labeled training data 316 includes input/output pairs in which each input (e.g., a feature vector corresponding to a qubit signal or a multiplexed qubit signal) is labeled with a desired output (e.g., state 0, state 1, or a multi-qubit state), also referred to as a supervisory signal. In contrast, unsupervised learning is based on unlabeled data 318 that does not include supervisory signals. The machine learning engine 310 may initially use supervised learning to train the classification model 312 and then use unsupervised learning to update the classification model 312 on an ongoing basis.

In an embodiment, the classification model 312 is an artificial neural network. An artificial neural network includes an input layer and an output layer, and may also include one or more hidden layers. Each layer includes one or more nodes (also referred to as artificial neurons) and one or more edges between nodes (i.e., in the same layer and/or in another layer). Edges may be associated with corresponding weights that represent the strengths of connections between nodes, which the machine learning engine 310 adjusts as machine learning proceeds. For example, the classification model 312 may be an artificial neural network with one hidden layer of five nodes. Additional layers and/or nodes may improve fidelity of qubit state readout, but may take longer and/or require additional computing resources. Many different machine learning techniques may be used. Examples described herein should not be construed as limiting one or more embodiments.

In an embodiment, a data repository 314 is any type of storage unit and/or device (e.g., a file system, database, collection of tables, or any other storage mechanism) for storing data. A data repository 314 may include multiple different storage units and/or devices. The multiple different storage units and/or devices may or may not be of the same type or located at the same physical site. Further, a data repository 314 may be implemented or may execute on the same computing system as one or more other components of the system 300. Alternatively or additionally, a data repository 314 may be implemented or executed on a computing system separate from one or more other components of the system 300. A data repository 314 may be logically integrated with one or more other components of the system 300. Alternatively or additionally, a data repository 314 may be communicatively coupled to one or more other components of the system 300 via a direct connection or via a network. In FIG. 3, a data repository 314 is illustrated as storing various kinds of information. Some or all of this information may be implemented and/or distributed across any of the components of the system 300. However, this information is illustrated within the data repository 314 for purposes of clarity and explanation.

In an embodiment, one or more components of the system 300 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Operations for Machine Learning Assisted Qubit State Readout

Figure 4:
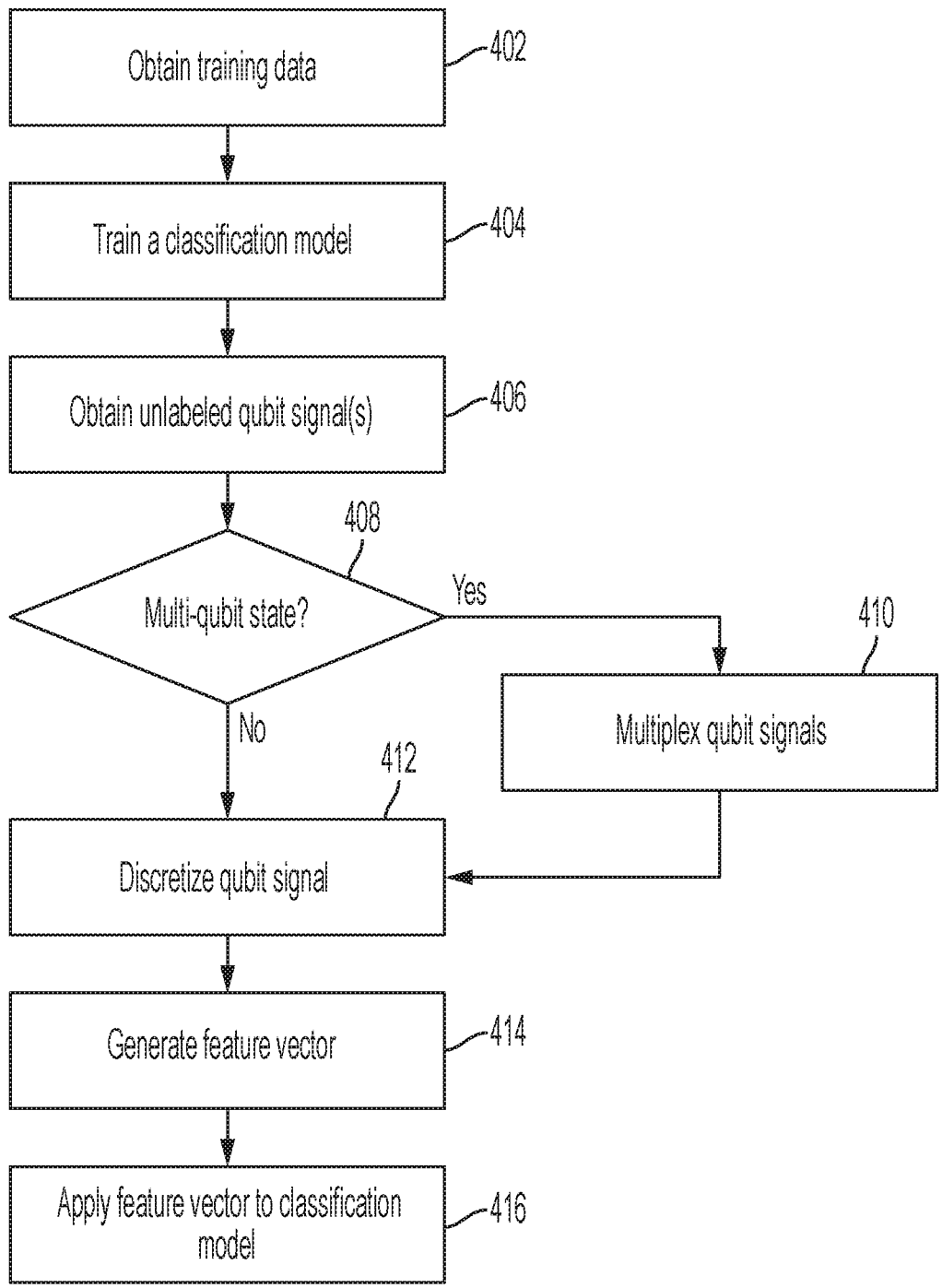
FIG. 4 is a flow diagram of an example of operations for machine learning assisted qubit state readout according to an embodiment.

FIG. 4 is a flow diagram of an example of operations for machine learning assisted qubit state readout, according to an embodiment. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a system (e.g., one or more components of system 300, described above) obtains training data (Operation 402). The training data includes data that describes qubit signals and supervisory signals corresponding to the respective known states (i.e., 0, 1, or a multi-qubit state) associated with those signals. Based on the training data, the system may train a classification model (Operation 404), e.g., train a neural network using supervised learning as described above, to perform qubit state readout.

In an embodiment, after training the classification model, the system obtains one or more unlabeled qubit signals (Operation 406). If the system receives multiple qubit signals, the system may determine whether those qubit signals correspond to a multi-qubit state (Operation 408). If the qubit signals correspond to a multi-qubit state, then the system may multiplex the qubit signals (Operation 410) to obtain a single, multiplexed qubit signal.

In an embodiment, the system discretizes the qubit signal (Operation 412). The system may generate a feature vector (Operation 414) that describes the qubit signal. The feature vector may be based on a discretized qubit signal. The system may apply the feature vector to the classification model (Operation 416). The classification model may generate, as output, a state (i.e., a single-qubit state or multi-qubit state) based on the feature vector.

In general, techniques described herein provide an advancement in qubit state readout technology that improves the functioning of hardware devices (e.g., quantum computers and/or other devices) that rely on qubit state readouts, referred to generally below as "quantum devices." For example, one or more embodiments may provide one or more of the following improvements:

Reduced Training Set Sizes. Achieving similar or better results with reduced training sizes can reduce the amount of time needed to bring a device to operational status (i.e., ready to perform computations), sometimes referred to as the "bring-up time." Bring-up time is relevant to initial device startup, with shorter bring-up time allowing the device to start performing calculations more quickly. Bring-up time is also relevant in situations where a quantum device may require intermittent resets and/or calibrations, which may include retraining a machine learning model. Performing a reset or calibration with a reduced training set size can provide a corresponding reduction in the device's downtime, thus increasing the number of calculations the device can perform over a time interval that includes a reset/calibration.

Increased Fidelity. As discussed above, one or more embodiments demonstrate improvements over prior techniques, given an equivalent training set. For a given training set, one or more embodiments therefore provide an improvement in raw performance over prior techniques. Increased fidelity may also improve the performance of devices executing algorithms that depend on qubit state readouts. Such algorithms are probabilistic in nature and therefore require multiple runs to converge on an answer. Increased fidelity of each readout therefore can reduce the number of times a device needs to execute an algorithm to converge on an answer, providing a corresponding reduction in processing time (i.e., allowing the device to perform faster). Some quantum devices use iterative algorithms to solve optimization problems. An algorithm may include a circuit, and that circuit may be modified based on the output of the algorithm; this process may be repeated until the algorithm converges on a "correct" or "optimal" circuit. (As used herein, the terms "correct" and "optimal" may refer to satisfying a prespecified threshold condition that may not correspond to a mathematically or theoretically "correct" or "optimal" result.) Even a small (e.g., 1-2 percent) improvement in readout fidelity can significantly reduce the time needed to converge on the answer and increase the chance of finding the answer at all.

3. Examples

Detailed examples are described below for purposes of clarity. Components and/or operations described below should be understood as examples that may not be applicable to one or more embodiments. Accordingly, components and/or operations described below should not be construed as limiting the scope of one or more embodiments.

In one example, machine learning assisted qubit state readout was tested using TensorFlow, an open source machine learning platform. Each feature vector described a qubit signal that was discretized at 512 time points, retaining the real components of the values. The classification model was a neural network with one hidden layer of five nodes, which was trained on 1,000 signal traces for each of qubit states 0 and 1 (i.e., 2,000 signal traces total). After training the neural network, testing was performed on 24,000 signal traces for each of qubit states 0 and 1 (i.e., 48,000 total), where the states were known. In this example, the resulting assignment fidelity was 87.9%. By comparison, a generalized matched filter was trained on 48,000 total signal traces, and when tested on these signal traces, its assignment fidelity was found to be 86.6%. Thus, a neural network successfully assigned 1.3% more of the testing set than the generalized matched filter. (Or, put another way, the neural network yielded about a 1.5% improvement over the matched filter's performance.) The gap widened when the filter kernel was calculated using only 1,000 signal traces for each of qubits 0 and 1, i.e., the same training data size that was used for the neural network approach. Testing the filter on a set of 48,000 signal traces yielded a fidelity of 62.9%, i.e., 24.3% less than the neural network approach. Thus, in this example, a neural network provided a significant improvement in fidelity when given the same amounts of training data and test samples.

Figure 5:
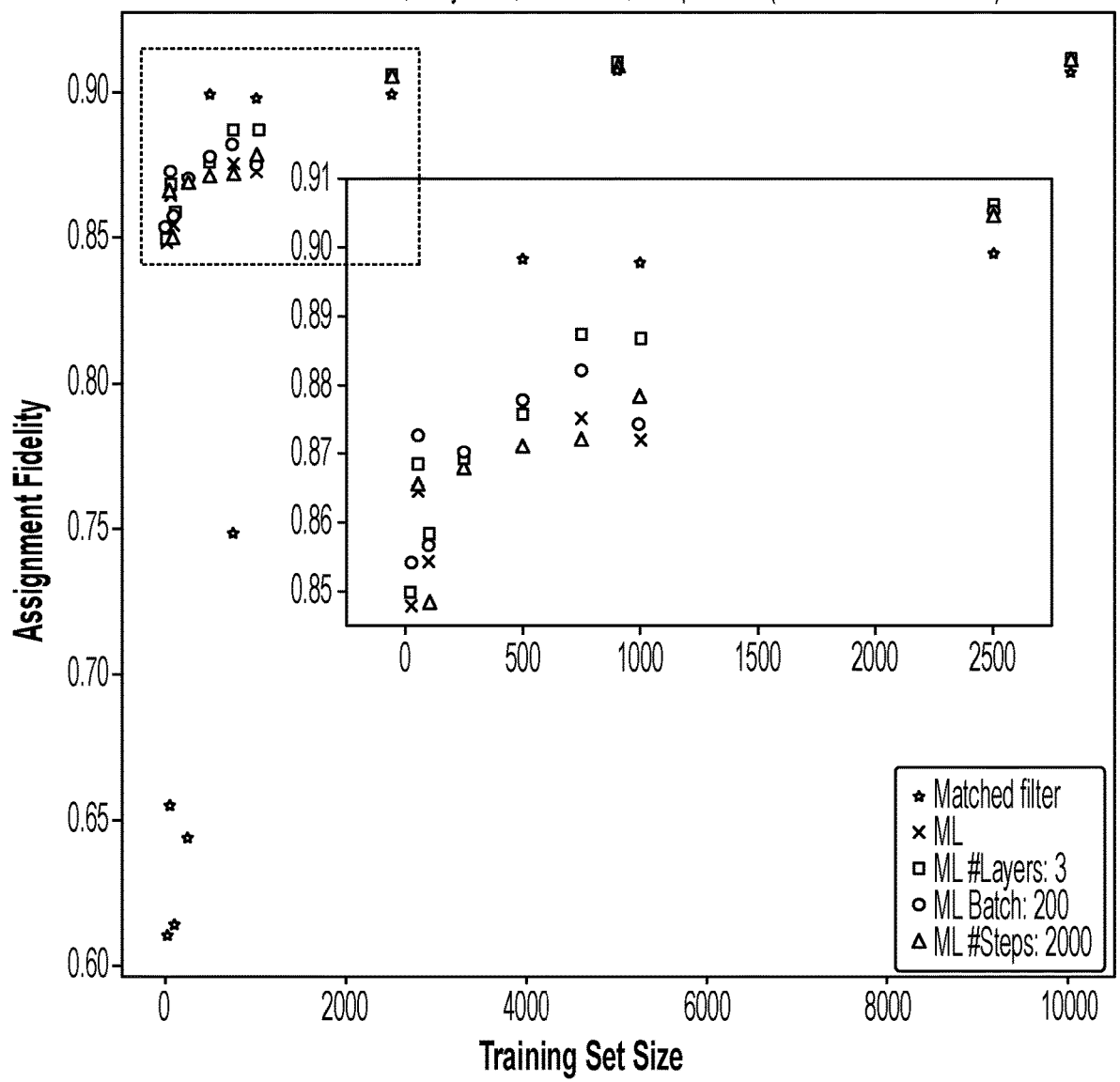
FIG. 5 illustrates qubit state readout fidelities according to an embodiment.

FIG. 5 illustrates qubit state readout fidelities according to an embodiment. Specifically, FIG. 5 illustrates qubit state readout fidelities determined by testing different techniques, including signal filtering ("matched filter") and various neural network ("ML") configurations, given different training data set sizes. Although these tests do not appear to provide a clear heuristic for determining an optimal classification model configuration, neural networks demonstrated a significant improvement over signal filtering for small training data set sizes (e.g., as discussed in the example above) and a lesser improvement for very large training data set sizes. Neural networks did not perform as well for intermediate training data set sizes in these tests.

Figure 6:
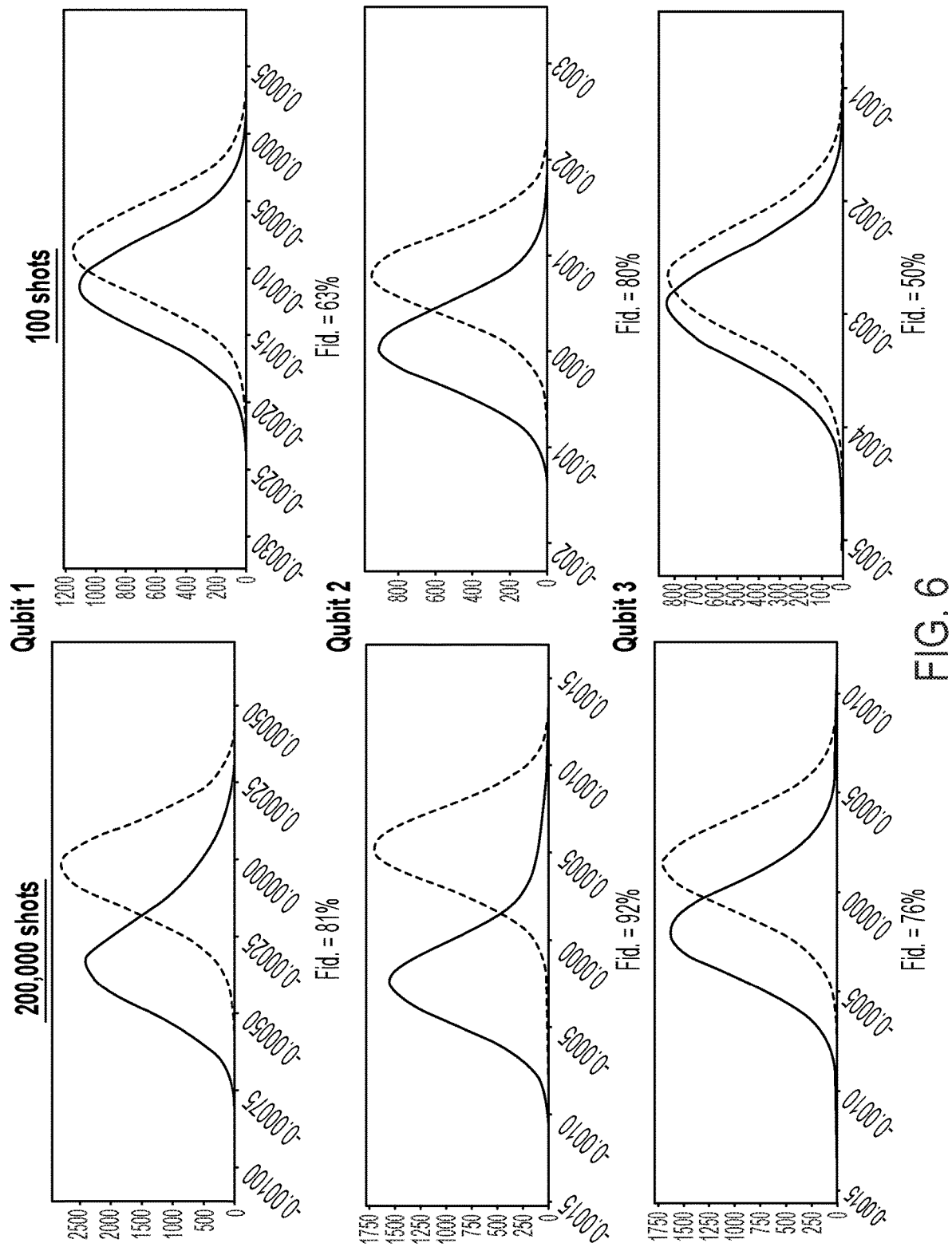
FIG. 6 illustrates multi-qubit state readout fidelities using signal filtering according to an embodiment.

FIG. 6 illustrates multi-qubit state readout fidelities using signal filtering according to an embodiment. As illustrated in FIG. 6, two sets of tests were run: one where the filter was calculated based on 200,000 shots and another where the filter was calculated based on only 100 shots. The 200,000-shot test yielded a 3-qubit fidelity of 57%, while the 100-shot test yielded a 3-qubit fidelity of only 26%. By comparison, tests were performed using a neural network trained on 100 shots. Different network geometries were tested, using 1-4 hidden layers and 25-1000 nodes per layer. In these tests, the signals for each qubit were processed independently; they were not multiplexed. The fidelities for qubits 1, 2, and 3 were 63%, 79%, and 59%, respectively, for a 3-qubit fidelity of 29%. The results for qubits 1 and 2 were comparable to using a matched filter calculated based on the same number of shots. This similarity may be explained by the fact that the signals for qubits 1 and 2 were observed to carry low noise, which resulted in a good matched filter even with only 100 shots. Meanwhile, the signal for qubit 3 was observed to be noisy and did not provide useful information in the average trace for a low shot number. This resulted in a poor matched filter, while the neural network achieved 9% better fidelity. In general, the fidelity and/or other performance characteristics of techniques described herein may depend, in part, on the quality and/or proper calibration of the equipment used to obtain qubit signals (e.g., generating a phase shift). Less sophisticated and/or poorly calibrated equipment may produce noisy signals and correspondingly lower classification fidelity. However, given the same signal, this example shows that techniques described herein may perform significantly better than prior approaches.

Figure 7:
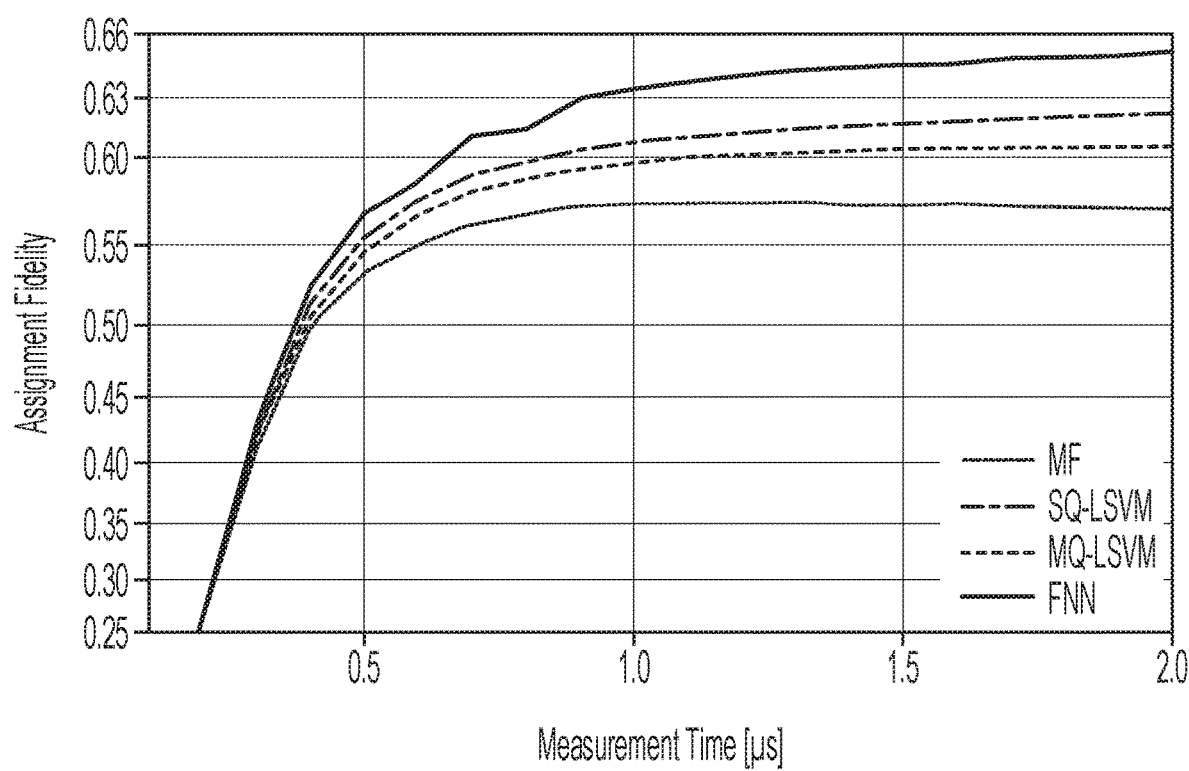
FIGS. 7-8 illustrate performance comparisons for 5-qubit readouts according to an embodiment.
Figure 8:
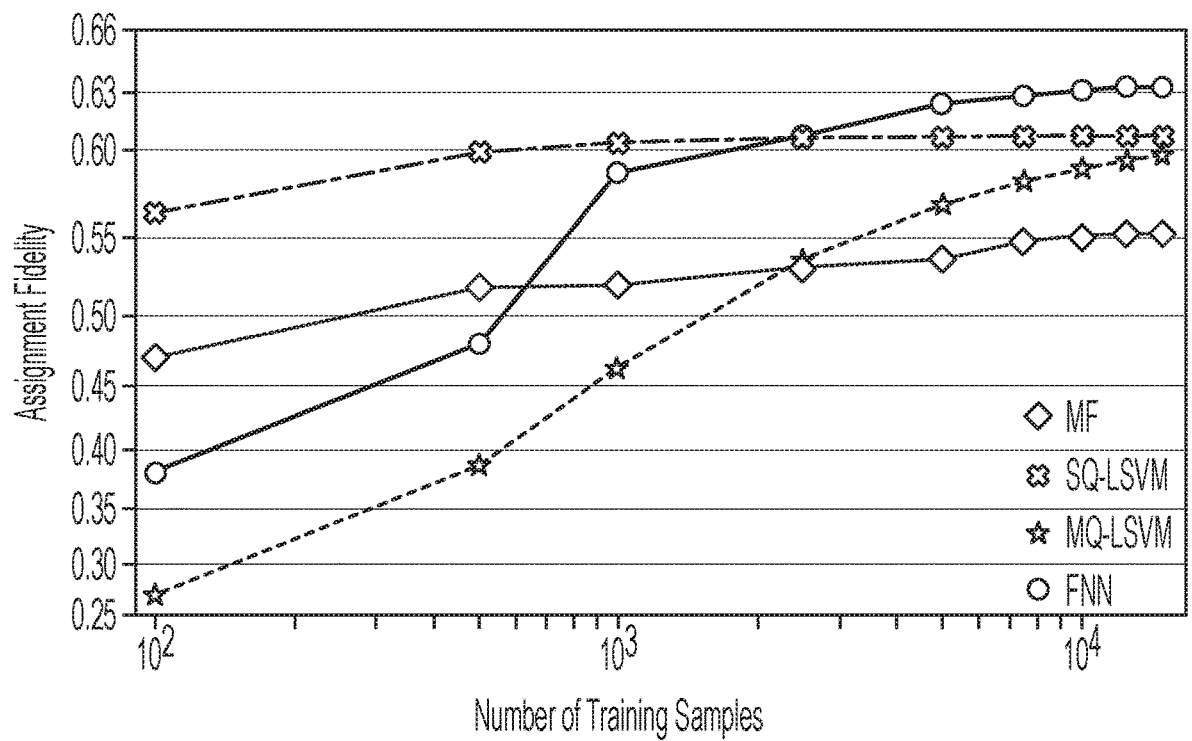
Figure 9:
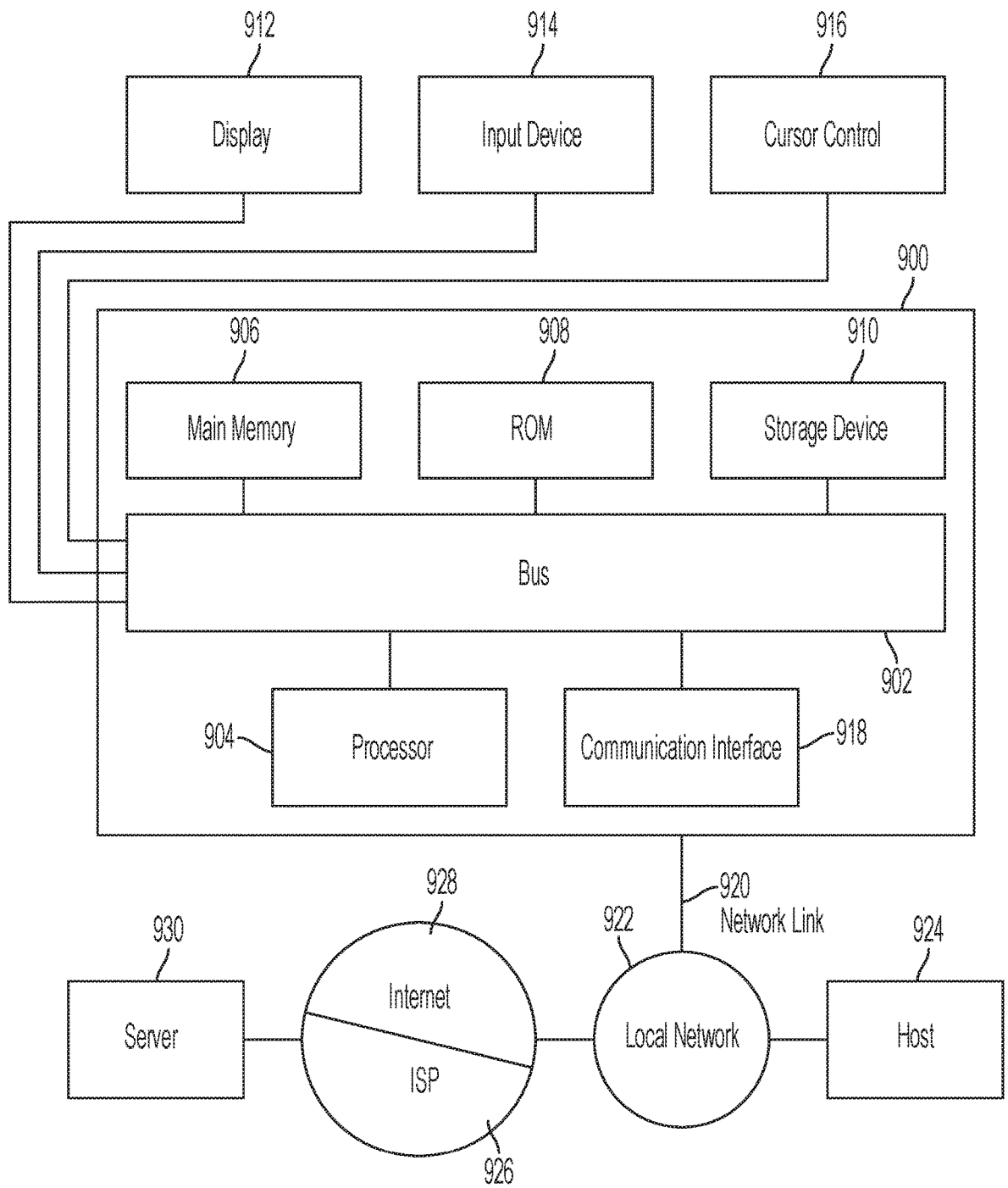
FIG. 9 is a block diagram of an example of a computer system according to an embodiment.

FIGS. 7-8 illustrate performance comparisons for 5-qubit readouts according to an embodiment. Specifically, FIGS. 7-8 illustrate comparisons between a neural network approach ("FNN") according to an embodiment, a matched filter ("MF"), a single-qubit support vector machine ("SQ-LSVM"), and a multi-qubit support vector machine ("MQ-LSVM"). The FNN approach used feedforward neural networks with three hidden layers. The first and second hidden layers had 500 nodes each; the third hidden layer had 100 nodes. Training used 10,000 shots per configuration (i.e., for the 32 states of 5 qubits, a total of 320,000 training shots), a batch size of 1,024, and a stepwise updated learning rate (starting at 0.001) over 200 epochs. To address the issue of batch normalization and have the network self-normalize, a scaled exponential linear unit (SELU) activation function was used instead of a rectified linear unit (ReLU) activation function. Testing used 35,000 shots per configuration (i.e., for the 32 states of 5 qubits, a total of 1,120,000 test shots). In FIG. 7, performance is illustrated as a function of measurement time. In this example, for 5-qubit readout, FNN yielded about a 4% performance improvement over SQ-LSVM, about a 5% performance improvement over MQ-LSVM, and about a 9% performance improvement over MF.

As illustrated in FIG. 8, relative performance of different approaches may depend on the size of the training set. In these 5-qubit experiments, relative to other approaches, a neural network approach performed better for larger training set sizes. In the 3-qubit experiments discussed above, relative to other approaches, a neural network approach performed better for smaller training set sizes. This difference may be attributable, at least in part, to different neural network topologies used in the different experiments. In general, these results suggest that proper design of the neural network may yield robust performance improvements over other approaches at all training set sizes.

In an embodiment, machine learning techniques described herein may be used to perform simultaneous multi-qubit classification. For example, a 2-qubit state presents a 4-state classification problem, with the possible states being {00, 01, 10, 11}. In one example, a neural network was trained on 100 shots. The output signals for two qubits were then multiplexed, discretized, vectorized, and input to the neural network. For this test, the 2-qubit fidelity was approximately 50%, which was comparable to the product of 1-qubit fidelities when two qubits were classified independently as described above. Thus, simultaneous 2-qubit classification achieved similar fidelity despite using a multiplexed signal and therefore requiring fewer computing resources.

In an embodiment, as discussed above, 1-qubit state readout using a neural network is effective and provides similar or better results when compared with industry-standard matched filtering. When neural networks and matched filtering are trained/calculated based on equivalent training data set sizes, neural networks can perform significantly better (e.g., 24.3% in one example described above). In addition, a neural network can achieve similar or better results using less training data.

In an embodiment, as discussed above, a neural network can be used to perform multi-qubit state readout, reducing the computational requirements associated with multi-qubit state readout (e.g., requiring only a single feature vector for two or more qubits). At least for two qubits, using a neural network to perform simultaneous multi-qubit state readout can provide similar fidelity to performing independent single-qubit state readouts, whether the single-qubit state readouts are performed using a neural network or other techniques.

4. Miscellaneous

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

5. Computing Devices

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

For example, FIG. 7 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 7 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

6. Computer Networks

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread) A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory machine-readable media storing instructions that, when executed by one or more processors, cause:
   processing one or more unlabeled qubit signals that describe one or more states of a set of qubits;
   multiplexing the one or more unlabeled qubit signals into a single signal that encodes information of the one or more unlabeled qubit signals;
   discretizing the single signal to generate a set of discrete data items that approximately represent the single signal;
   applying vector generation functionality to the set of discrete data items to generate one or more features vectors that include the discrete data items; and
   determining the one or more states corresponding to the one or more unlabeled qubit signals by applying a neural network to the one or more feature vectors.

2. The one or more media of claim 1,
   wherein the processing further comprises processing paths comprising a first processing path and a second processing path; and
   wherein the first processing path comprises, based at least in part on a determination that two or more unlabeled qubit signals comprise multiple unlabeled qubit signals, performing the multiplexing, the discretizing, and the applying vector generation functionality.

3. The one or more media of claim 1, wherein the second processing path comprises, based at least in part on a determination that the one or more unlabeled qubit signals comprise one unlabeled qubit signals, discretizing the one unlabeled qubit signal to generate a set of discrete data items associated with the one unlabeled qubit signal.

4. The one or more media of claim 3, wherein the second processing path further comprises, based at least in part on the set of discrete data items, generating an output comprising one or more feature vectors associated with the one or more unlabeled qubit signals.

5. The one or more media of claim 1, wherein the neural network comprises a single hidden layer.

6. The one or more media of claim 1, wherein operations performed by the neural network result from training operations comprising:
   obtaining a set of training data, wherein obtaining the set of training data includes:
      receiving a plurality of qubit signals; and
      inputting sets of the qubit signals to a signal processor at least including a vector generator running on the one or more processors, yielding a first plurality of feature vectors, each feature vector of the first plurality having a respective supervisory signal; and
   processing the one or more unlabeled qubit signals further includes:
      receiving the one or more unlabeled qubit signals from the output of a quantum computer external to the one or more processors; and
      inputting the one or more unlabeled qubit signals to the signal processor at least including the vector generator, yielding a second plurality of feature vectors, each feature vector of the second plurality lacking a supervisory signal.

7. The one or more media of claim 6, wherein:
   the one or more processors are electronic digital processors;
   the neural network is a feedforward neural network implementing a classification model that executes on the one or more processors; and
   determining the one or more states corresponding to the one or more unlabeled qubit signals by applying the neural network includes inputting each of the second plurality of feature vectors to the neural network to yield a corresponding qubit state of one or more qubits of the quantum computer.

8. The one or more media of claim 7, wherein the instructions, when executed by the one or more processors, further cause the one or more processors to perform an optimization operation based on one or more qubit state yielded by the neural network.

9. A system comprising:
   at least one device including a hardware processor;
   the system being configured to perform operations comprising:
      processing one or more unlabeled qubit signals that describe one or more states of a set of qubits;

multiplexing the one or more unlabeled qubit signals into a single signal that encodes information of the one or more unlabeled qubit signals;

discretizing the single signal to generate a set of discrete data items that approximately represent the single signal;

applying vector generation functionality to the set of discrete data items to generate one or more features vectors that include the discrete data items; and determining the one or more states corresponding to the one or more unlabeled qubit signals by applying a neural network to the one or more feature vectors.

10. The system of claim 9, wherein the processing comprises processing paths comprising a first processing path and a second processing path; and wherein the first processing comprises, based at least in part on a determination that one or more unlabeled qubit signals comprise multiple unlabeled qubit signals, encoding information of the multiple unlabeled qubit signals into a single unlabeled qubit signal.

11. The system of claim 10, wherein the first processing path further comprises discretizing the single unlabeled qubit signal to generate a set of discrete data items associated with the one or more unlabeled qubit signals.

12. The system of claim 9, wherein the second processing path comprises, based at least in part on a determination that the one or more unlabeled qubit signals comprise one unlabeled qubit signals, discretizing the one unlabeled qubit signal to generate a set of discrete data items associated with the one unlabeled qubit signal.

13. The system of claim 12, wherein the second processing path further comprises, based at least in part on the set of discrete data items, generating an output comprising one or more feature vectors associated with the one or more unlabeled qubit signals.

14. The system of claim 9, wherein the neural network comprises a single hidden layer.

15. A computer-implemented method comprising:

processing one or more unlabeled qubit signals that describe one or more states of a set of qubits;

wherein the processing further comprises multiplexing the one or more unlabeled qubit signals into a single signal that encodes information of the one or more unlabeled qubit signals;

wherein the processing further comprises discretizing the single signal to generate a set of discrete data items that approximately represent the single signal;

wherein the processing further comprises applying vector generation functionality to the set of discrete data items to generate one or more features vectors that include the discrete data items; and determining the one or more states corresponding to the one or more unlabeled qubit signals by applying a neural network to the one or more feature vectors.

16. The computer-implemented method of claim 15, wherein the first processing comprises, based at least in part on a determination that one or more unlabeled qubit signals comprise multiple unlabeled qubit signals, encoding information of the multiple unlabeled qubit signals into a single unlabeled qubit signal; and wherein the processing comprises processing paths comprising a first processing path and a second processing path.

17. The computer-implemented method of claim 15, wherein the second processing path comprises, based at least in part on a determination that the one or more unlabeled qubit signals comprise one unlabeled qubit signals, discretizing the one unlabeled qubit signal to generate a set of discrete data items associated with the one unlabeled qubit signal.

18. The computer-implemented method of claim 17, wherein the second processing path further comprises, based at least in part on the set of discrete data items, generating an output comprising one or more feature vectors associated with the one or more unlabeled qubit signals.

* * * * *